US012264055B2

(12) United States Patent
Peter et al.

(10) Patent No.: US 12,264,055 B2
(45) Date of Patent: Apr. 1, 2025

(54) DEVICE FOR FILLING A CONTAINER AND METHOD FOR OPERATING THE DEVICE

(71) Applicant: KRONES AG, Neutraubling (DE)

(72) Inventors: Michael Peter, Siegenburg (DE); Thomas Gren, Pentling (DE)

(73) Assignee: KRONES AG, Neutraubling (DE)

( * ) Notice: Subject to any disclaimer, the term of this patent is extended or adjusted under 35 U.S.C. 154(b) by 118 days.

(21) Appl. No.: 18/219,029

(22) Filed: Jul. 6, 2023

(65) Prior Publication Data

US 2024/0010482 A1 Jan. 11, 2024

(30) Foreign Application Priority Data

Jul. 6, 2022 (DE) ........................ 102022116838.7

(51) Int. Cl.
*B67C 3/28* (2006.01)
*B65B 3/00* (2006.01)
*B67C 3/26* (2006.01)

(52) U.S. Cl.
CPC ................ *B67C 3/286* (2013.01); *B65B 3/00* (2013.01); *B67C 3/26* (2013.01)

(58) Field of Classification Search
CPC .... B67C 3/02; B67C 3/22; B67C 3/26; B67C 3/28; B67C 3/286; B65B 3/00; B65B 3/04
See application file for complete search history.

(56) References Cited

U.S. PATENT DOCUMENTS 9,114,969 B2 * 8/2015 Huitorel .................... B67C 3/28
9,511,986 B2 * 12/2016 Clusserath .............. B67C 3/026
11,148,924 B2 * 10/2021 Bandini .................... B67C 3/22
2009/0293985 A1 * 12/2009 Till ........................... B67C 3/26 141/1
2016/0297662 A1 * 10/2016 Baumgartner .......... B67C 3/286
2019/0375621 A1 * 12/2019 Bandini .................... B67C 3/22
2020/0031649 A1 * 1/2020 Heuser .................... B67C 3/286

FOREIGN PATENT DOCUMENTS

DE 202005004090 U1 6/2005
DE 102014117831 A1 6/2016
DE 102018132953 A1 * 6/2020 ............... B67C 3/28
EP 2708491 B1 * 7/2016 ........... B67C 3/2608
EP 3078628 A1 10/2016
EP 3031774 B1 * 7/2018 ............... B67C 3/28
EP 3581542 A1 12/2019
EP 3581542 B1 * 1/2021 ........... B65B 39/004
EP 3925928 A1 12/2021
EP 3802400 B1 * 8/2023 ............... B67C 3/12
WO WO 2018/141558 A1 8/2018

* cited by examiner

*Primary Examiner* — Nicolas A Arnett
(74) *Attorney, Agent, or Firm* — Caesar Rivise, PC

(57) ABSTRACT

The invention relates inter alia to a device for filling a container. The device comprises a filling valve for discharging a filling material into the container. The device further comprises a throttle valve for adjusting a flow rate of the filling material. The throttle valve comprises a valve member for adjusting a flow cross-section. The throttle valve has a pneumatic drive that is operatively connected to the valve member for moving the valve member, and an electric drive that is operatively connected to the valve member for moving the valve member. Advantageously, the device can combine the advantages of a pneumatic throttle control and the advantages of an electric throttle control.

20 Claims, 3 Drawing Sheets

DEVICE FOR FILLING A CONTAINER AND METHOD FOR OPERATING THE DEVICE

TECHNICAL FIELD

The invention relates to a device for filling a container, to a filler having a plurality of devices for filling, and to a method for operating a device for filling.

CROSS-REFERENCE TO RELATED APPLICATIONS

This application claims priority from German Patent Application No. DE 10 2022 116 838.7 filed Jul. 6, 2022, the contents of which application is incorporated herein by reference in its entireties for all purposes.

TECHNICAL BACKGROUND

In filling plants for filling a filling material into containers, such as bottles, a filler for filling the containers can be included. The filler can have at least one filling station or device for filling the containers. The device can have a throttle valve for adjusting a flow rate during filling, and a filling valve downstream of the throttle valve for dispensing the filling material to the container. The throttle valve can be actuated pneumatically or by an electric motor, for example.

WO 2018/141558 A1 describes a device for filling liquid or flowable contents into packaging, comprising a tank, a filling device with a filling valve, a line which connects the tank to the filling device, and a throttle valve which is arranged in the line between the tank and the filling device. The throttle valve has a variable flow cross-section. The throttle valve has an actuator for adjusting the flow cross-section. The actuator serves to change the valve position and can comprise, for example, a pneumatic actuation unit.

A disadvantage of a pneumatic drive of a throttle valve can be that it is limited in practical applications to a limited number of controllable positions when precise reproducible accuracy is required. An electrical actuator can be disadvantageous in that it is not suitable for a filling material comprising pulp, lumps, etc., due to a small valve member path or stroke, and closes only relatively slowly.

The object of the invention is to provide an improved device for filling a container, with which the mentioned disadvantages can preferably be overcome at least in part. Preferably, the device should be suitable for filling both pulpy (lumpy/fibrous) liquid filling materials and pulp-free (lump-free/fiber-free) liquid filling materials, for example, still or carbonized, without having to make compromises regarding the filling rate.

SUMMARY OF THE INVENTION

The object is achieved by the features of the independent claims. Advantageous developments are specified in the dependent claims and the description.

One aspect of the present disclosure relates to a device for filling a container (e.g., filling station for a filler). The device has a filling valve for discharging a (e.g., liquid or pasty) filling material into the container (e.g., in a state pressed onto a container mouth of the container). The device has a throttle valve for adjusting a flow rate of the filling material, wherein the throttle valve is arranged upstream of the filling valve. The throttle valve has a valve member for adjusting a flow cross-section of the throttle valve. The throttle valve has a pneumatic drive which is operatively connected to the valve member for moving the valve member. The throttle valve has an electric drive which is operatively connected to the valve member for moving the valve member.

Advantageously, the device can allow for combining the advantages of an electrical control of the throttle valve with the advantages of a pneumatic control of the throttle valve. The electric drive can be used, for example, for adjusting the flow rate for clear filling materials or products without pulp, fibers or lumps. However, a closing function (for example for completely or partially closing the throttle valve) over the entire stroke, which may be necessary for filling pulpy, etc. filling materials, can be carried out very quickly by the pneumatic drive and independently of a speed of the electric drive. Particularly advantageously, the pneumatic drive can be used to support the performance of the electric drive, for example in the case of carbonized filling materials with increased filling pressure. It can thus be advantageously allowed for a less powerful electric drive to be installed, which requires less installation space and is more cost-effective. The lower current consumption can also be particularly advantageous, since, for example, less current has to be transmitted to a rotating part of a rotary filler, as a result of which a structurally less complex slip ring transmitter or the like can also be provided.

The pneumatic drive can preferably be a pneumatic cylinder-piston drive.

Preferably, the electric drive can be an electromechanical, electromotive, electromagnetic or piezoelectric drive, e.g., a stepper motor.

In one exemplary embodiment, the pneumatic drive (e.g., a piston and/or a pressure chamber of the pneumatic drive) is connected between the valve member and the electric drive. Advantageously, the pneumatic drive can thus be operated, on the one hand, alone and, on the other hand, in combination with the electric drive for moving the valve member.

In a further exemplary embodiment, the pneumatic drive and the electric drive can be decoupled from one another and coupled to one another. When decoupling the pneumatic drive from the electric drive, the valve member can preferably be movable only by the pneumatic drive and not by the electric drive, for example for the closing function. Advantageously, a joint operation of the electric drive and pneumatic drive can be made possible during coupling, for example for relieving the electric drive.

In a further exemplary embodiment, the pneumatic drive has a pressure chamber, to which compressed air can be supplied, and a (e.g., one-part or multi-part) piston in operative connection between the valve member and the pressure chamber. Preferably, the piston of the pneumatic drive can limit the pressure chamber. Advantageously, a reliable realization of the pneumatic drive can thus be made possible, which can advantageously be connected to the electric drive in order, for example, to operate both drives in combination or only the pneumatic drive.

In a further exemplary embodiment, the piston of the pneumatic drive can be moved independently of the electric drive. In this way, the valve member can advantageously be moved by operating only the pneumatic drive. Alternatively or additionally, the piston of the pneumatic drive can be pushed and/or supported by the electric drive. In this way, a movement of the valve member can advantageously be effected by a joint operation of the pneumatic drive and electric drive or only by operation of the electric drive.

In one embodiment, the electric drive has a piston which is preferably movable by a spindle nut of the electric drive. Advantageously, a reliable realization of the electric drive can thus be made possible, which can advantageously be connected to the pneumatic drive in order, for example, to operate both drives in combination or only the electric drive.

In a further embodiment, the piston of the electric drive can be brought into operative connection, preferably into physical contact, with the piston of the pneumatic drive for pushing and/or supporting the piston of the pneumatic drive. Alternatively or additionally, the piston of the pneumatic drive and the piston of the electric drive have contact surfaces opposite each other for mutual contacting. Alternatively or additionally, the valve member and the piston of the electric drive are arranged at opposite ends of the piston of the pneumatic drive. A reliable and simple design for fulfilling the functions explained can thus advantageously be provided.

In a further embodiment, the piston of the pneumatic drive can be moved independently of the piston of the electric drive. Alternatively or additionally, the piston of the pneumatic drive can be pushed and/or supported by the piston of the electric drive. Alternatively or additionally, the piston of the electric drive is movable in the pressure chamber. A reliable and simple design for fulfilling the functions explained can thus likewise advantageously be provided.

In one variant, the device further comprises a control device which is configured to operate the throttle valve in different operating modes. The operating modes can preferably include a pure pneumatic drive operating mode, in which only the pneumatic drive is operated for moving the valve member and/or for holding a position of the valve member, preferably for closing the throttle valve (e.g., for assuming the closed position or the partially open position). Alternatively or additionally, the operating modes can preferably include a pure electric drive operating mode, in which only the electric drive is operated for moving the valve member and/or for holding a position of the valve member, preferably for fine-tuning the flow cross-section. Alternatively or additionally, the operating modes can preferably include a combined operating mode, in which both the pneumatic drive and the electric drive are operated, preferably simultaneously, for moving the valve member and/or for holding a position of the valve member. Preferably, a control pressure of the pneumatic drive can be adjustable for the combined operating mode. For example, the control pressure is generally 5-6 bar. In the combined operating mode, the control pressure can be adjustable, for example, from 0 bar to max.

Preferably, the term "control device" can refer to an electronic system (e.g., embodied as a driver circuit or with microprocessor(s) and data memory) and/or a mechanical, pneumatic, and/or hydraulic controller which can take over control tasks and/or regulation tasks and/or processing tasks, depending on the design. Although the term "control" is used herein, this can also comprise or be understood as "regulate" or "feedback-control" and/or "process."

In one variant, the valve member has a passage channel, preferably a notch, for passing a (e.g., pulpy, fibrous or lumpy, liquid) filling material (e.g., at low flow rate), preferably in a partially open position of the throttle valve, in which the throttle valve can substantially only be passed through the passage channel. The passage channel can have the advantage that small pulps, fibers, etc. have available a larger cross-section at low flow rates, which reduces the risk of blocking.

In a further variant, the valve member is screwed onto a piston of the pneumatic drive.

In one exemplary embodiment, the throttle valve has a return spring which biases the valve member in the direction toward an open position or a closed position and is preferably arranged coaxially to a piston of the pneumatic drive. Alternatively or additionally, the throttle valve can have a bellows for sealing between the valve member and a valve housing of the throttle valve, which bellows is preferably arranged coaxially to a piston of the pneumatic drive.

In a further exemplary embodiment, the throttle valve is designed as an oblique seat valve. The oblique seat valve can advantageously be a through-valve with comparatively low flow resistance and with a comparatively small deflection of a filling material flow. In the present case, the oblique seat valve can provide a good compromise between the requirements on flow characteristics, valve tightness and required installation space.

In a further exemplary embodiment, the device further comprises a static throttle arranged upstream of the throttle valve, and/or a flow measuring device arranged upstream of the filling valve and upstream or downstream of the throttle valve. In contrast to devices for filling, which only fill pulp-free/lump-free/fiber-free filling materials and have only one electrically driven throttle valve, the static throttle can provide a flow cross-section required for filling pulpy/lumpy/fibrous filling materials. However, the flow cross-section provided by the static throttle can be designed to be comparatively large and can thus allow greater flow rates for non-critical (pulp-free/lump-free/fiber-free) filling materials. Advantageously, a flow of the filling material can be measured by means of the flow measuring device. Depending on the measurement by the flow measuring device, for example, a control device can operate the throttle valve and/or the filling valve (for example opening and/or closing) and/or adjust an operation of the throttle valve and/or of the filling valve (for example opening duration and/or opening width).

Another aspect of the present disclosure relates to a filler, preferably a rotary filler or linear filler, comprising a plurality of devices for filling as disclosed herein. The filler can advantageously afford the same advantages as those which have already been explained with reference to the device for filling.

Preferably, the filler can be included in a container processing system for manufacturing, cleaning, coating, checking, filling, closing, labeling, printing, and/or packaging containers for liquid media, preferably beverages or liquid foods.

For example, the containers can be configured as bottles, cans, canisters, cartons, vials, etc.

Another aspect of the present disclosure relates to a method for operating a device as disclosed herein, comprising at least one of:

- filling a pulpy, fibrous or lumpy liquid filling material into a container by means of the device, wherein the valve member is moved and/or held only by the pneumatic drive in a closed position and/or in a partially open position (in addition, regulation up to a minimum stroke adapted to the particles in the filling material can be possible via the electric drive; said minimum stroke can be limited via a control/regulation);
- filling a pulp-free, fiber-free, lump-free and liquid filling material into a container by means of the device, wherein the flow cross-section for fine-tuning a filling speed during filling is adjusted and/or held only by the electric drive or by a combined action of the electric drive and the pneumatic drive by moving the valve member; and assisting the electric drive by means of the pneumatic drive, preferably for reducing a current consumption of the electric drive.

The preferred embodiments and features of the invention described above can be combined with one another as desired.

BRIEF DESCRIPTION OF THE DRAWINGS

Further details and advantages of the invention are described below with reference to the accompanying drawings, in which.

The embodiments shown in the drawings correspond at least in part, so that similar or identical parts are provided with the same reference signs and reference is also made to the description of other embodiments or figures for the explanation thereof to avoid repetition.

DETAILED DESCRIPTION OF EMBODIMENTS

Figure 1:
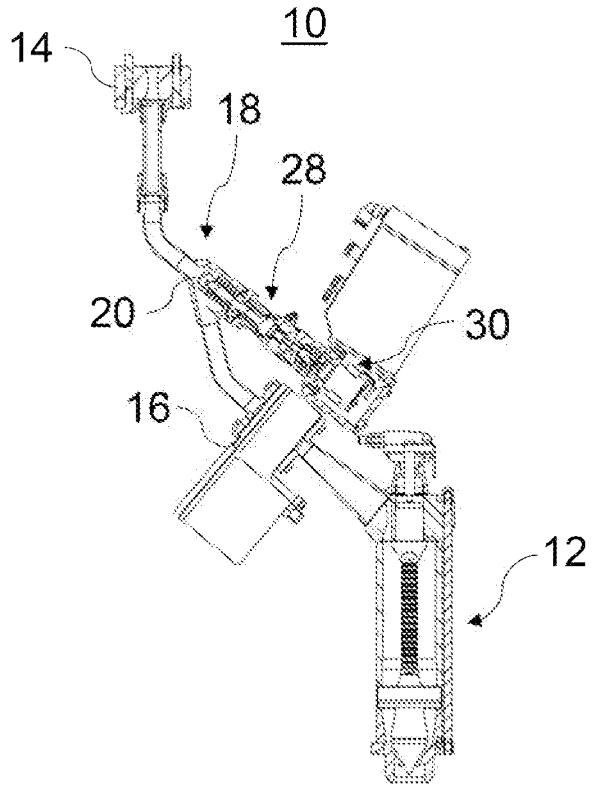
FIG. 1 shows a schematic sectional view through a device for filling a container according to an exemplary embodiment of the present disclosure.

FIG. 1 shows a device 10 for filling a container. Preferably, the device 10 can fill the container with a liquid or pasty filling material, optionally comprising lumps, pulp or fibers. The filling material can be a beverage, for example.

Preferably, a filler of a container processing system can have a plurality of the devices 10. The filler can be designed as a rotary filler or a filler carousel with a plurality of devices 10 arranged around a circumference of the rotary filler. Alternatively, the filler can be designed, for example, as a linear filler with a plurality of devices 10 arranged next to each other and/or one behind the other. The filler can preferably fill several containers simultaneously or with temporal overlap by means of the plurality of devices 10.

For example, the filler can be arranged downstream of a cleaning device for cleaning the containers and/or downstream of a production device for producing the containers. The filler can be arranged upstream of a closer for closing the containers.

The device 10 comprises a filling valve 12 and a throttle valve 18. The device 10 can optionally comprise a static throttle 14 and/or a flow measuring device 16.

The filling valve 12 serves to discharge the filling material from the device 10 into a container. The container is preferably positioned below the filling valve 12. The container can be pressed, for example, with its container mouth onto the filling valve 12 for aseptic filling and/or for pressure filling. Pressing can be achieved, for example, by a lifting device which enables a vertical movement of the filling valve 12 and/or of the container.

The filling valve 12 can be the last or most downstream valve of the device 10 with respect to a flow direction of the filling material. The filling valve 12 can receive the filling material after the filling material has passed through the throttle valve 18 and optionally the static throttle 14 and/or the flow measuring device 16. A fluid line can connect the filling valve 12 and the flow measuring device 16 and/or the throttle valve 18 to one another.

The filling valve 12 can be actuated in any which way. For example, the filling valve 12 can be pneumatically actuated. Alternatively, the filling valve 12 can be actuated hydraulically or electrically (e.g., by an electric motor or electromechanically or piezoelectrically).

The static throttle 14 can be arranged downstream of a filling material tank (not shown in the figures). The static throttle 14 can be arranged upstream of the throttle valve 18. Accordingly, the static throttle 14 can also be arranged upstream of the flow measuring device 16 and the filling valve 12. A fluid line can connect the static throttle 14 and the throttle valve 18 to one another.

The static throttle 14 can have a cross-sectional narrowing for throttling a filling material flow in the direction of the filling valve 12. Pre-throttling of the filling material can take place by means of the static throttle 14 before the filling material reaches the throttle valve 18.

The flow measuring device 16 can measure a flow of a filling material through the flow measuring device 16. The flow measuring device 16 can apply any known measuring principle.

The flow measuring device 16 can be arranged upstream of the filling valve 12. As shown in FIG. 1, the flow measuring device 16 can be arranged downstream of the throttle valve 18. However, it is also possible, for example, for the flow measuring device 16 to be arranged upstream of the throttle valve 18. A fluid line can connect the flow measuring device 16 and the throttle valve 18 to one another.

The throttle valve 18 serves to adjust a flow rate of the filling material through the device 10 or during filling. The throttle valve 18 is described in more detail below with reference to FIG. 1 to 4.

The throttle valve 18 is arranged upstream of the filling valve 12. The throttle valve 18 can be arranged downstream of the optional static throttle 14. The throttle valve 18 can be arranged downstream of a filling material tank (not shown in the drawings). The throttle valve 18 can be arranged upstream or downstream of the optional flow measuring device 16.

The throttle valve 18 has a valve member 20, a pneumatic drive 28 and an electric drive 30. The throttle valve 18 can optionally also have a return spring 24 and/or a bellows 26. Particularly preferably, the valve member 20 and the bellows 26 are inseparably connected to each other.

The valve member 20 serves to adjust a flow cross-section provided by the throttle valve 18. The valve member 20 can be designed as a valve cone, for example. The valve cone can, for example, be blunt or pointed. The flow cross-section at the valve seat of the throttle valve 18 can be predetermined, for example, by a gap, such as a preferably uniform annular gap, between the valve member 20 and an inner channel wall of the throttle valve 18. The flow cross-section can additionally be predetermined in combination with a passage channel 22 of the valve member 20.

The valve member 20 can preferably be translationally movable or displaceable. The valve member 20 can be moved by the pneumatic drive 28 and by the electric drive 30.

The throttle valve 18 is preferably designed as a so-called oblique seat valve. Preferably, a movement axis of the valve member 20 can run obliquely to an outflow direction of the filling material from the throttle valve 18, as shown in FIG.

1 to 4. Alternatively or additionally, the movement axis of the valve member 20 can run obliquely to an inflow direction of the filling material into the throttle valve 18.

Figure 2:
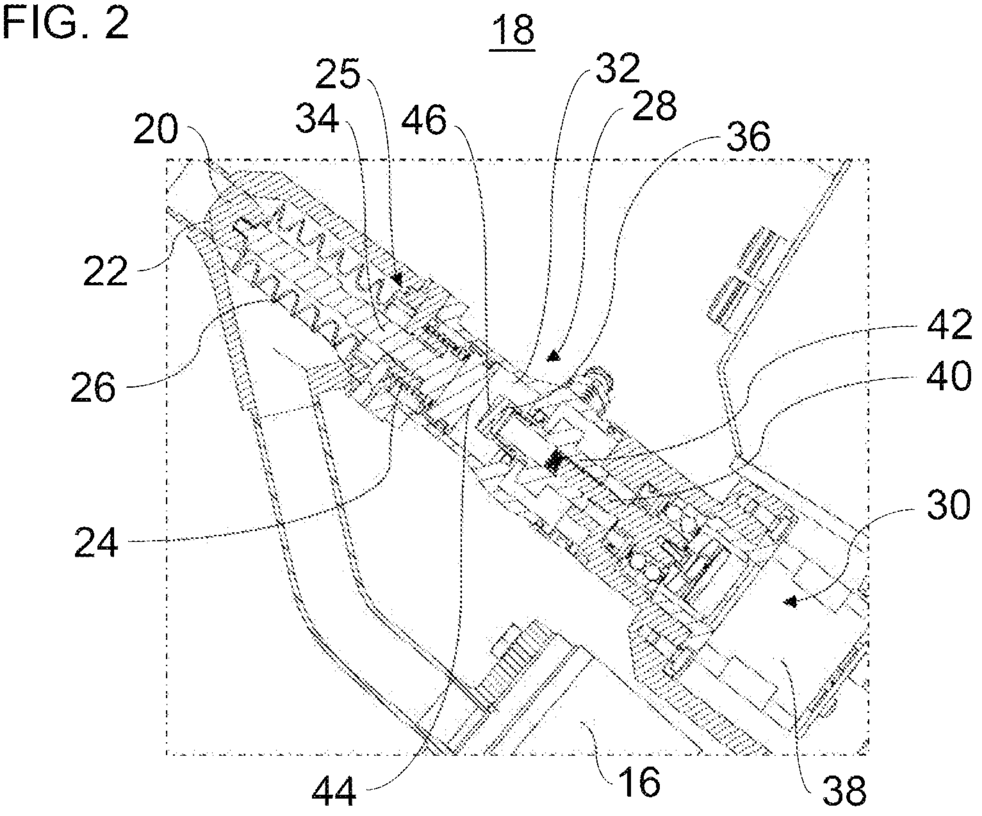
FIG. 2 shows a schematic sectional view through a throttle valve of the exemplary device of FIG. 1 in a closed position.

Preferably, the throttle valve 18 or the valve member 20 can be moved into a closed position, as shown in FIG. 2. The valve member 20 can block the throttle valve 18 in the closed position. A flow cross-section through the throttle valve 18 can be equal to zero in the closed position. No filling material can pass through the throttle valve 18 in the closed position. The valve member 20 can preferably be moved by the pneumatic drive 28 into the closed position. Particularly preferably, the valve member 20 can be moved into the closed position only by the pneumatic drive 28, i.e., not by the electric drive 30.

Figure 4:
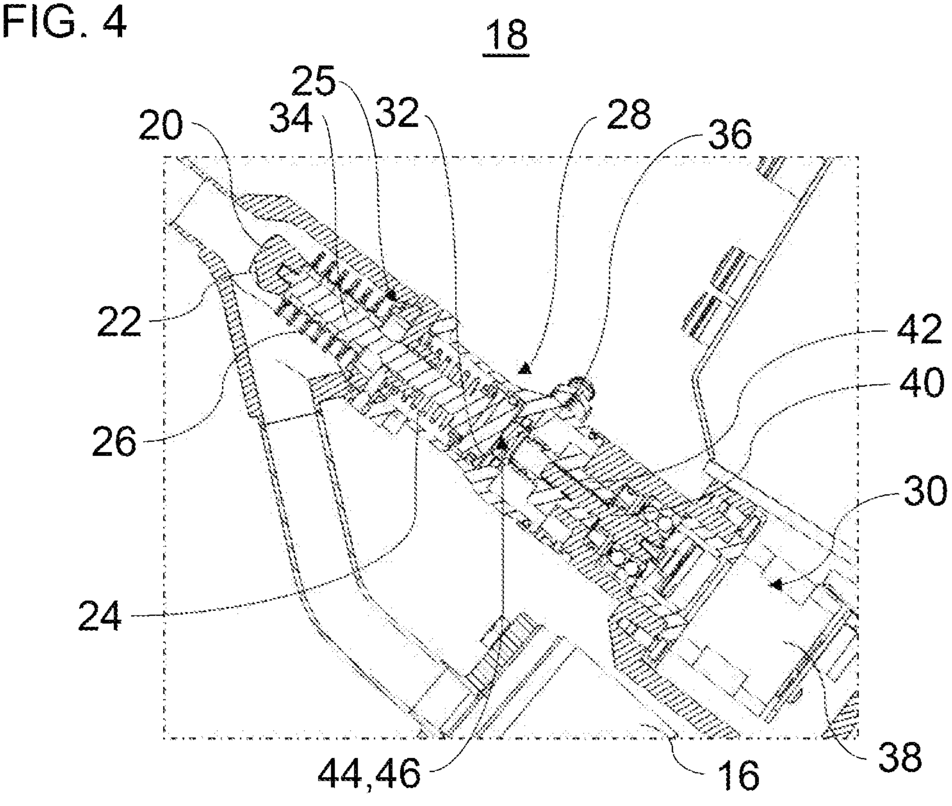
FIG. 4 shows a schematic sectional view through a throttle valve of the exemplary device of FIG. 1 in an open position.

Preferably, the throttle valve 18 or the valve member 20 can be moved into an open position, as shown in FIG. 4. A flow cross-section predetermined by the valve member 20 can be maximum in the open position. Preferably, the valve member 20 can be moved into the open position by the electric drive 30, for example against an elastic bias and/or when the pneumatic drive 28 is deactivated.

Figure 3:
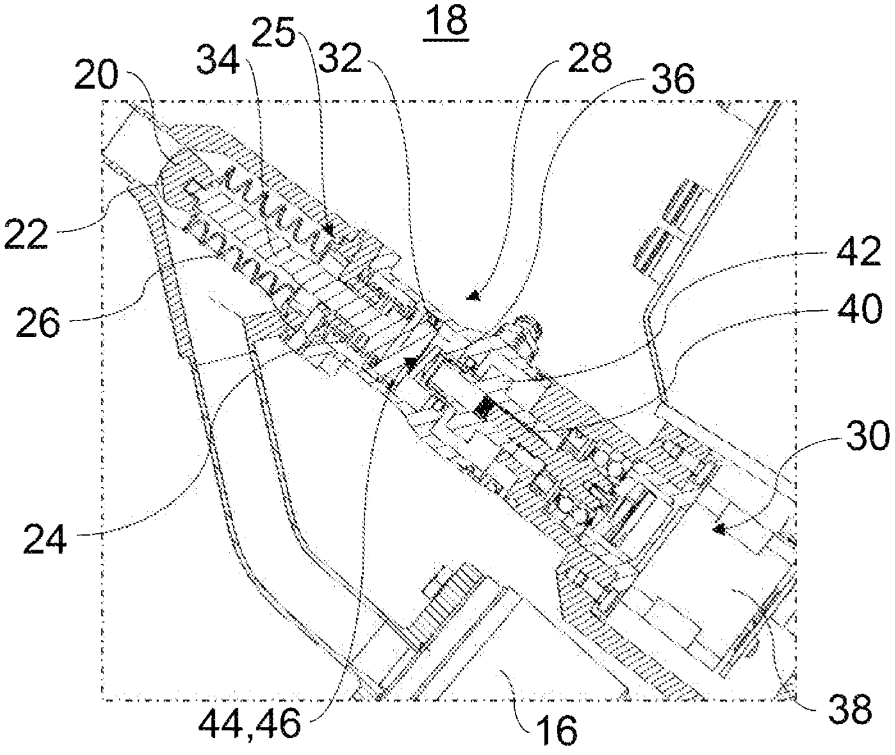
FIG. 3 shows a schematic sectional view through a throttle valve of the exemplary device of FIG. 1 in an intermediate position or a partially open position.

Preferably, the valve member 20 can be moved into (at least) one partially open position, as shown in FIG. 3. In the partially open position, the filling material can pass through the throttle valve 18, but only through the passage channel 22 of the valve member 20. The passage channel 22 can be designed as a notch, for example. The passage channel 22 can be arranged, for example, in a corner region or edge region of the valve member 20. The valve member 20 can be moved into the partially open position, for example, by the pneumatic drive 28 and/or the electric drive 30.

Preferably, the valve member 20 can assume further positions, for example between the partially open position and the open position. Preferably, the valve member 20 can be continuously adjusted by the electric drive 30 at least in portions or completely between the partially open position and the open position.

The return spring 24 can elastically bias the valve member 20 in the direction toward the open position. The return spring 24 can be a compression spring, for example. Alternatively, the return spring 24 can elastically bias the valve member 20, for example in the direction toward the closed position (not shown in the drawings).

The bellows 26 can seal between the valve member 20 and a valve housing of the throttle valve 18. An additional sealing element 25 can be provided between the valve member 20 and a valve housing of the throttle valve 18. The bellows 26 can be compressible and expandable along a movement axis of the valve member 20. For example, the bellows 26 can be made of plastics material, e.g., PTFE (polytetrafluoroethylene), or metal. The force required for moving the valve member 20 can be significantly reduced in the case of a bellows made of plastics material.

The pneumatic drive 28 is operatively connected to the valve member 20 for moving the valve member 20. The pneumatic drive 28 can be connected between the valve member 20 and the electric drive 30.

The pneumatic drive 28 can have a pressure chamber 32 and a piston 34.

The pneumatic drive 28 can be arranged between the valve member 20 and the electric drive 30. Specifically, the pressure chamber 32 and the piston 34 can be arranged between the valve member 20 and the electric drive 30.

Compressed air can be supplied to the pressure chamber 32. The pressure chamber 32 can receive the compressed air from a compressed air source, e.g., a compressor.

The piston 34 can be operatively connected between the valve member 20 and the pressure chamber 32. The piston 34 can have a one-part or multi-part design. The piston 34 can delimit the pressure chamber 32. When compressed air is supplied to the pressure chamber 32, the piston 34 can be moved for moving the valve member 20, for example in the direction toward the closed position or into the closed position. A sealing element, e.g., a sealing ring, for sealing the pressure chamber 32 can be arranged between the piston 34 and a valve housing of the throttle valve 18.

When compressed air is supplied to the pressure chamber 32, the piston 34 can be moved against an elastic bias by the return spring 24. The return spring 24 can return the piston 34 and the valve member 20 when an outflow of compressed air from the pressure chamber 32 is enabled. The return spring 24 can be supported, on one side, on a valve housing of the throttle valve 18 and, on the other side, on the piston 24. The return spring 24 can be arranged coaxially to the piston 34.

Preferably, the valve member 20 can be attached directly to one end of the piston 34. For example, the valve member can be screwed onto the end. The bellows 26 can be arranged coaxially to the piston 34. Preferably, the bellows 26 can be clamped by the valve member 20 and the piston 34.

The electric drive 30 is likewise operatively connected to the valve member 20 for moving the valve member 20.

The electric drive 30 can have a piston 36 and a drive unit 38, e.g., a stepper motor. The electric drive 30 can further comprise a spindle 40 and a spindle nut 42.

The piston 36 can be moved by the drive unit 38. The spindle 40 and the spindle nut 42 can be arranged between the piston 36 and the drive unit 38. The spindle nut 42 can be in engagement with the spindle 40. The spindle 40 and the spindle nut 42 can jointly convert a rotational movement of the drive unit 38 into a linear movement with which the piston 36 can be moved. The piston 36 can be connected to the spindle nut 42. The piston 36 can be movable by the spindle nut 42. A sealing element, e.g., a sealing ring, for sealing the pressure chamber 32 can be arranged between the piston 36 and a valve housing of the throttle valve 18.

The pneumatic drive 28 and the electric drive 30 can be coupled to one another. Piston 34 can be supported by piston 36. For example, piston 36 can be brought into operative connection with piston 34 for pushing piston 34. The operative connection can preferably consist of a physical contact between the pistons 34 and 36. For example, an end of piston 36 facing the valve member 20 can contact an end of piston 34 facing away from the valve member 20. Specifically, piston 36 can have a preferably frontal contact surface 46 which can come into contact with a preferably frontal contact surface 44 of piston 34. The contact can be produced, for example, when piston 36 is extended by the electric drive 30 so far that it is positioned in the pressure chamber 32 (see FIGS. 3 and 4). The pressure chamber can preferably be an annular space if the pistons 34 and 36 contact one another or if the electric drive 30 and the pneumatic drive 28 are coupled to one another.

In the coupled state, a movement of the valve member 20 and/or a holding of a position of the valve member 20 can be effected, for example, by operating only the electric drive 30. In the coupled state, the pistons 34 and 36, preferably their contact surfaces 44 and 46, can rest against each other or at least be indirectly supported on each other.

Accordingly, a control device of the device 10 can operate the throttle valve 18 in a pure electric drive operating mode, in which only the electric drive 30 is operated for moving the valve member 20 and/or for holding a position of the valve member 20, and the pneumatic drive 28 is not operated (i.e., for example, no supply of compressed air to the pressure chamber 32). For example, fine-tuning of the flow cross-section can take place in this operating mode, for example when a non-carbonized (still) filling material is filled in with, for example, a comparatively low working pressure.

In the coupled state, a movement of the valve member 20 and/or a holding of a position of the valve member 20 can preferably (also) be effected by a common operation of the pneumatic drive 28 and the electric drive 30.

Accordingly, a control device of the device 10 can operate the throttle valve 18 into a combined operating mode in which both the pneumatic drive 28 and the electric drive 30 are operated, preferably simultaneously, for moving the valve member 20 and/or for holding a position of the valve member 20. In this case, the electric drive 30 can be assisted by the pneumatic drive 28 so that, for example, a current consumption of the electric drive 30 can be reduced. This combined operating mode can preferably also be used for fine-tuning the flow cross-section, for example when a carbonized filling material is filled in with, for example, a working pressure between 5 bar and 6 bar. An operating pressure of the pneumatic drive 28 can be reduced compared to the usual working pressure in order to support the electric drive 30.

The pure electric drive operating mode and/or the combined operating mode can be used, for example, when filling the containers with a pulp-free, fiber-free and/or lump-free liquid filling material in order to move the valve member 20 into a desired position for fine-tuning the flow cross-section and to hold it there.

On the other hand, the pneumatic drive 28 and the electric drive 30 can be decoupled from one another. For example, the pistons 34 and 36 can be positioned such that the pistons 34 and 36 do not contact or support each other. The contact surfaces 44 and 46 can preferably be remote from one another. This can be the case, for example, when piston 36 is positioned completely outside the pressure chamber 32 and/or when the pneumatic drive 28 is operated independently of the electric drive 30. Accordingly, piston 34 can be moved independently of the electric drive 30 or the piston 36 in order to move the valve member 20, if desired.

In the decoupled state, a movement of the valve member 20 and/or a holding of a position of the valve member 20 can preferably be effected by operating only the pneumatic drive 28.

Accordingly, a control device of the device 10 can operate the throttle valve 18 in a pure pneumatic drive operating mode in which only the pneumatic drive 28 is operated for moving the valve member 20 and/or for holding a position of the valve member 20, and the electric drive 30 is not operated (i.e., for example, no drive by the drive unit 38). This pure pneumatic drive operating mode can preferably be used for moving or holding the valve member in the closed position and/or in the partially open position.

The pure pneumatic drive operating mode can be used, for example, when filling the containers with a pulpy, fibrous or lumpy liquid filling material in order to move the valve member into the closed position during filling breaks or when filling is completed, and to hold it there, and/or to move the valve member 20 into the partially open position and to hold it there.

Figure 5:
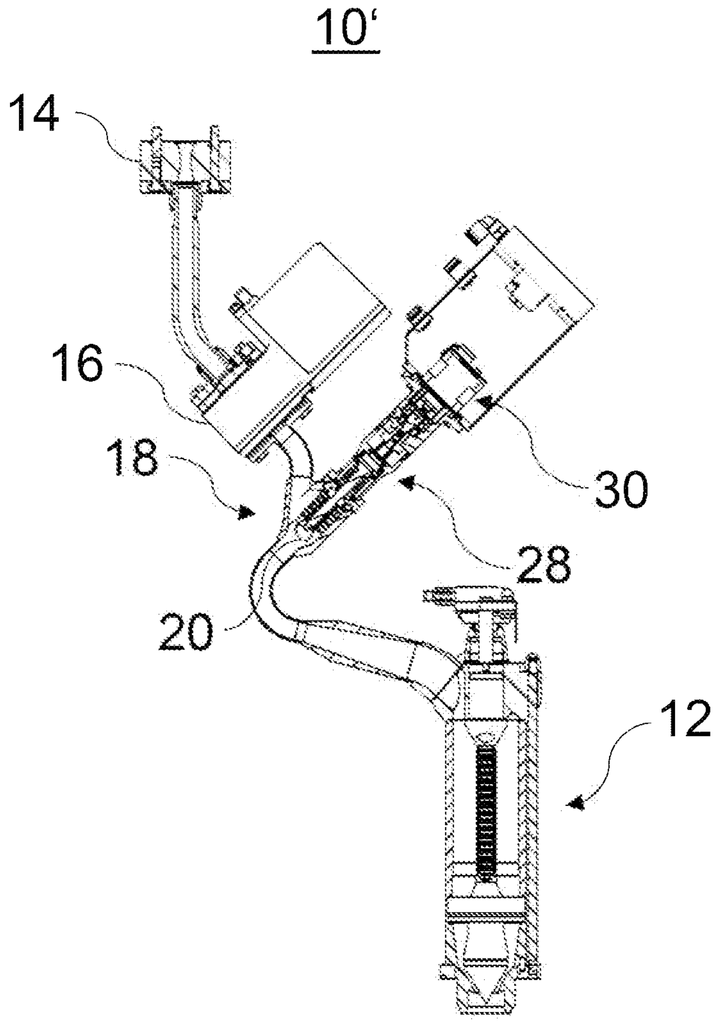
FIG. 5 shows a schematic sectional view through a device for filling a container according to another exemplary embodiment of the present disclosure.

FIG. 5 shows a device 10' for filling a container which is modified compared to FIG. 1. In contrast to the device 10 of FIG. 1, the flow measuring device 16 of the device 10' of FIG. 5 is arranged upstream of the throttle valve 18.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, individual features of the independent claims are each disclosed independently of one another. In addition, the features of the dependent claims are also disclosed independently of all of the features of the independent claims and, for example, independently of the features relating to the presence and/or the configuration of the filling valve, throttle valve, valve member, pneumatic drive and/or electric drive of the independent claims.

LIST OF REFERENCE SIGNS

10 Device for filling
12 Filling valve
14 Static throttle
16 Flow measuring device
18 Throttle valve
20 Valve member
22 Passage channel
24 Return spring
25 Sealing element
26 Bellows
28 Pneumatic drive
30 Electric drive
32 Pressure chamber
34 Piston
36 Piston
38 Drive unit
40 Spindle
42 Spindle nut
44 Contact surface
46 Contact surface

What is claimed is:

1. A device for filling a container, comprising:
a filling valve for discharging a filling material into the container; and
a throttle valve for adjusting a flow rate of the filling material, wherein the throttle valve is arranged upstream of the filling valve and includes:
a valve member for adjusting a flow cross-section of the throttle valve,
a pneumatic drive that is operatively connected to the valve member (20) for moving the valve member, and
an electric drive that is operatively connected to the valve member for moving the valve member.

2. The device according to claim 1, wherein:
the pneumatic drive is connected between the valve member and the electric drive.

3. The device according to claim 1, wherein:
the pneumatic drive and the electric drive are configured to be decoupled from one another and coupled to one another.

4. The device according to claim 1, wherein:
the pneumatic drive includes a pressure chamber configured to receive compressed air, and a piston in operative connection between the valve member and the pressure chamber.

5. The device according to claim 4, wherein the piston of the pneumatic drive limits the pressure chamber.

6. The device according to claim 4, wherein:

the piston of the pneumatic drive is movable independently of the electric drive; and the piston of the pneumatic drive is configured to be pushed and supported by the electric drive.

7. The device according to claim 4, wherein:

the electric drive includes a piston.

8. The device according to claim 7, wherein the piston is movable by a spindle nut of the electric drive.

9. The device according to claim 7, wherein at least one of:

the piston of the electric drive is configured to be brought into operative connection with the piston of the pneumatic drive for one of pushing and supporting the piston of the pneumatic drive;

the piston of the pneumatic drive and the piston of the electric drive have contact surfaces opposite each other for mutual contacting; and the valve member and the piston of the electric drive are arranged at opposite ends of the piston of the pneumatic drive.

10. The device according to claim 7, wherein at least one of:

the piston of the pneumatic drive is movable independently of the piston of the electric drive;

the piston of the pneumatic drive is configured to be one of pushed and supported by the piston of the electric drive; and the piston of the electric drive is movable in the pressure chamber.

11. The device according to claim 1, further comprising:

a control device which is configured to operate the throttle valve in different operating modes, including at least one of:

a pure pneumatic drive operating mode, in which only the pneumatic drive is operated for one of moving the valve member and holding a position of the valve member;

a pure electric drive operating mode in which only the electric drive is operated for one of moving the valve member and holding a position of the valve member; and a combined operating mode in which both the pneumatic drive and the electric drive are operated for one of moving the valve member and holding a position of the valve member.

12. The device according to claim 11, wherein one of the pneumatic drive is operated for closing the throttle valve, the electric drive is operated for fine-tuning the flow cross-section, and both the pneumatic drive and the electric drive are operated simultaneously.

13. The device according to claim 1, wherein at least one of:

the valve member has a passage channel for passing the filling material, in which the throttle valve is configured to be passed through only the passage channel; and the valve member is screwed onto a piston of the pneumatic drive.

14. The device according to claim 13, wherein the passage channel is configured for passing the filling material in a partially open position of the throttle valve.

15. The device according to claim 1, wherein at least one of:

the throttle valve has a return spring which biases the valve member in a direction toward an open position or a closed position; and the throttle valve has a bellows for sealing between the valve member and a valve housing of the throttle valve.

16. The device according to claim 15, wherein at least one of the return spring is arranged coaxially to a piston of the pneumatic drive, and the bellows is arranged coaxially to the piston of the pneumatic drive.

17. The device according to claim 1, wherein:

the throttle valve is designed as an oblique seat valve.

18. The device according to claim 1, further comprising at least one of:

a static throttle arranged upstream of the throttle valve; and a flow measuring device arranged upstream of the filling valve and one of upstream and downstream of the throttle valve.

19. A filler, comprising:

a plurality of the devices for filling according to claim 1, wherein the filler is one of a rotary filler and a linear filler.

20. A method for operating a device according to claim 1, comprising at least one of:

filling a pulpy, fibrous or lumpy liquid filling material into a container by means of the device, wherein the valve member is at least one of moved and held only by the pneumatic drive in one of a closed position and a partially open position;

filling a pulp-free, fiber-free, lump-free and liquid filling material into a container via the device, wherein the flow cross-section for fine-tuning a filling speed during filling is at least one of adjusted and held only by the electric drive or by a combined action of the electric drive and the pneumatic drive by moving the valve member; and assisting the electric drive via the pneumatic drive.

* * * * *